Nov. 23, 1937.   T. L. STAINBROOK   2,099,869
VALVE LOCK
Filed Jan. 21, 1937
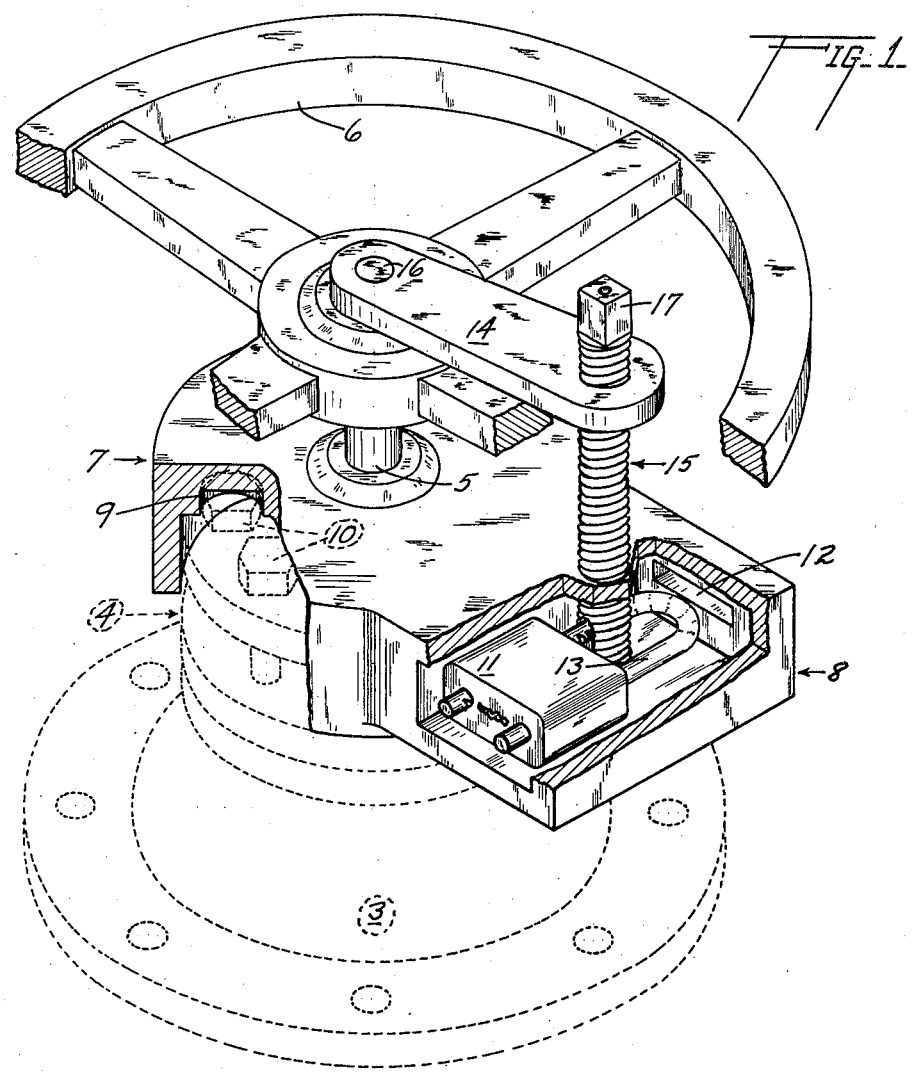
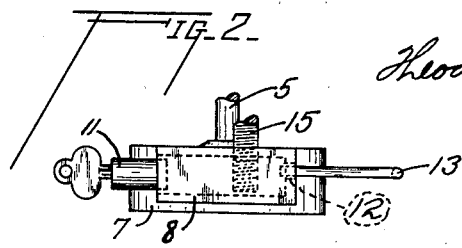
INVENTOR
Theodore Lewis Stainbrook
BY
ATTORNEY Patented Nov. 23, 1937

2,099,869

UNITED STATES PATENT OFFICE 2,099,869

VALVE LOCK

Theodore Lewis Stainbrook, Garber, Okla.

Application January 21, 1937, Serial No. 121,402

10 Claims. (Cl. 70—180)

This invention relates to improved means for preventing the unauthorized operation of valves of various types, and the inventive idea also includes a means of preventing the drainage of fluid through the packing, as well as a protector to prevent the tampering with or breaking of the lock.

Objects of the invention are to provide a positive locking device of this class operative between the valve casing and the valve actuating mechanism so constructed that the valve may be locked in any one of numerous desired positions, either open or shut, regardless of the wear on the valve parts, and the consequent change in the "full shut" or "full open" positions of the valve actuating mechanism; and which will prevent the operation of the valve even though the operating handle or wheel of the valve be broken, mutilated, or removed.

Other objects of the invention will be fully understood from a consideration of the following detailed description when read in connection with the accompanying drawing which forms a part of this application. While the drawing shows one specific embodiment, particularly for a valve having circular flanges on the stuffing box, it is evident that a mere change in the shape of the device to accommodate valves having different shaped stuffing boxes or flanges would be included fully in the inventive idea. The drawing, therefore, is to be considered as illustrative and not restrictive.

Referring to the drawing:

Figure 1 is a perspective view of the device with portions cut away to show its application to a valve head, which is shown in broken lines; and, Figure 2 is a side elevation of the device, showing its relation to the valve operating stem, and particularly showing the application of the removable hasp padlock.

Like characters of reference denote like parts in all the figures.

The nature of the valve mechanism below the cover 3 is immaterial to a discussion of the invention. The shape of the valve casing, or of the valve cover, or of the stuffing box, designated as a whole by the numeral 4, is also immaterial. The invention is applicable to any valve of any construction which is operated by a control shaft 5. In the drawing the control shaft 5 is provided with the usual hand wheel 6. The shaft 5, of course, passes through the stuffing box 4. All these are conventional valve parts.

The invention includes a jacket 7 for the stuffing box, which jacket is made integral with a lock protector 8. The two are separated by a solid wall between them. The jacket has a solid top which is provided with an opening, suitably located, to permit the stem 5 to pass freely therethrough, and to rotate freely therein. If the valve on which the device is to be placed has a circular stuffing box then the jacket is made circular so that its wall snugly fits the stuffing box. A plurality of suitably sized depressions 9 are formed interiorly in the top wall of the jacket to receive the heads 10 of the stuffing box bolts. By means of the bolt heads seating in these depressions, the jacket is prevented from being rotated about the stuffing box. If the stuffing box be of an irregular shape, the jacket 7 is made in the same irregular shape to fit the stuffing box snugly. The very irregularity in shape would then prevent the rotation of the jacket 7 about the stuffing box, and the depressions 9 could be dispensed with, if desired.

The interior size of the lock projector 8 is such in cross area that the body 11 of an adjustable shackle padlock may barely slide lengthwise therein. The protector is fully open at one end only to permit the body of the lock to enter. At the opposite end, the wall is provided with a slot 12, which permits the separable shackle 13 to enter the protector. As shown in Fig. 2 the slot 12 is positioned slightly nearer to the top wall of the protector than to the bottom wall. Thus when the shackle and body of the padlock assume their locked position, as in Fig. 1, the shackle is slightly below the slot 12, and is not easily accessible to one attempting to break the lock. The protector may be of any length, but is preferably just slightly longer than the shackle 13. This affords protection for the body 11 of the lock, as well as the ends of the shackle 13, protruding therefrom.

In addition to the jacket 7, lock protector 8, and padlock, the inventive idea includes an anchor plate 14, and a lock bolt 15. The anchor plate 14 is provided at one end with a threaded perforation to fit the usual threaded upper end 16 of the control shaft 5. Near its other end the plate 14 is provided with another threaded perforation to fit the heavy bolt 15. The top of the protector 8 is also provided with a threaded through perforation to receive the lower end of the bolt 15. The center to center distance between the two perforations in the plate 14 may vary, but is always identical to the center to center distance between the perforation in the top of the jacket 7 and the perforation in the top of the protector 8.

The bolt 15 has a through slot of sufficient width to admit one leg of the shackle 13, as shown, and of sufficient length that its upper wall is in substantially the same horizontal plane as the upper wall of the slot 12 in the protector, when the end of the bolt is seated on the lower wall of the protector 8. This arrangement facilitates insertion of the shackle through the slot 12 into the slot in the bolt, and into its home position in the lock body 11. The perforation in the top of the protector 8 must be located away from the center of the protector a sufficient distance that the slot in the bolt will be aligned with one or the other of the legs of the shackle, when the lower end of the bolt is screwed into the interior of the protector. The upper end 17 of the bolt 15 is irregularly shaped to facilitate its rotation by a wrench, or other means.

To install the device on an ordinary valve it is simply necessary to remove the usual control shaft nut and the hand wheel 6 from the control shaft 5, place the jacket 7 over the stuffing box 4, replace the hand wheel 6, screw the anchor plate 14 on the end 16 of the shaft 5, rotate the hand wheel until the valve is in the position in which it is desired to lock it, and screw the bolt 15 through the threaded perforations in the plate 14 and in the top of the protector 8 until it seats, or almost seats on the bottom wall of the protector. The removable shackle 13 is then inserted through the slot 12 and one of its legs passes through the slot in the lower end of the bolt 15. The body 11 of the lock is then pushed on the two ends of the shackle, locking the entire valve against operation. To again change the adjustment of the valve the lock is unlocked, the body 11 and shackle 13 removed from the interior of the protector, and the bolt 15 unscrewed until its lower end is free of the upper wall of the protector. The hand wheel may then be turned at will to any desired position, the anchor plate repositioned and the valve locked as above described.

It will be noted that the jacket 7 prevents tampering with the stuffing box, or drainage of the controlled fluid therethrough; that the protector 8 prevents injury or removal of the lock, and particularly that the anchor plate 14, due to the fact that it is rigidly secured at one end to the control shaft 5 and at the other end to the rigidly held bolt 15, positively prevents rotation of the shaft 5, when the valve is locked in a closed position, even though the hand wheel 6 is broken so that its spokes would clear the bolt 15. This is true as applied to valves of usual construction because the shaft 5, in turning, would be raised. This raising of the shaft would be prevented by the rigid anchor plate 14, due to the fact that the bolt 15 is prevented from being turned to raise the other end of the plate a corresponding distance.

I contemplate forming the bolt 15, the anchor plate 14, the jacket 7, and the protector of any material which, under test, best serves the purpose intended.

While I have described and illustrated a specific embodiment of my invention, I am aware that numerous alterations may be made therein without departing from the inventive idea, and I do not wish to be limited except by the prior art and the scope of the appended claims.

I claim:

1. A device of the class described comprising: a jacket adapted to cooperatively engage and encase a valve stuffing box and to be held against rotation about the stuffing box by said engagement; an anchor plate adapted to threadedly engage the valve control shaft outside the jacket; and lock means rigidly connecting the anchor plate and the jacket for preventing relative movement between the two in any direction.

2. A device of the class described comprising: a jacket adapted to cooperatively engage and encase a valve stuffing box and to be held against rotation about the stuffing box by said engagement; an anchor plate adapted to threadedly engage the valve control shaft outside the jacket; and a bolt threadedly engaging the free end of the anchor plate and also threadedly engaging said jacket, for preventing relative movement between the two in any direction.

3. A device of the class described comprising: a jacket adapted to cooperatively engage and encase a valve stuffing box and to be held against rotation about the stuffing box by said engagement; an anchor plate adapted to threadedly engage the valve control shaft outside the jacket; adjustable means connecting the plate and jacket for locking them against relative movement in any direction; and means for preventing adjustment of said last mentioned means with relation to said jacket and said plate.

4. A device of the class described comprising: a jacket adapted to cooperatively engage and encase a valve stuffing box and to be held against rotation about the stuffing box by said engagement; an anchor plate adapted to threadedly engage the valve control shaft outside the jacket; a bolt threadedly engaging the free end of said anchor plate and said jacket for locking them against relative movement in any direction; and means for locking said bolt against rotation with relation to said plate or jacket.

5. A device of the class described comprising: a jacket adapted to cooperatively engage and encase a valve stuffing box and to be held against rotation about the stuffing box by said engagement; an anchor plate adapted to threadedly engage the valve control shaft outside the jacket; a bolt threadedly engaging the free end of said anchor plate and said jacket for locking them against relative movement in any direction; means for locking said bolt against rotation with relation to said plate or jacket; and means for protecting said locking means against tampering.

6. In a device of the class described, the combination with a valve casing member and a valve control member protruding therefrom, of: a jacket for the casing member prevented from rotating about the casing member by its complementary engagement therewith; a plate threadedly secured to said valve control member; and means for securing said jacket and plate together rigidly in spaced relation to render said control member immovable longitudinally with respect to said casing member.

7. In a device of the class described, the combination with a valve casing member and a valve control member protruding therefrom, of: complementary locking parts applied to the respective members, one of said parts being threaded to its respective member for rotative and nonslidable relationship; and means for locking said locking parts against relative longitudinal or rotational movement with respect to each other and with respect to said casing and control members.

8. A device of the class described comprising: a jacket for non-rotatably engaging and encasing the stuffing box of a valve; a lock protector rigidly positioned on the side wall of said jacket; an anchor plate having one of its ends threadedly secured to the control shaft of the valve; a bolt adapted to threadedly engage the other end of said anchor plate and to threadedly engage one wall of said protector for preventing relative longitudinal and rotational movement between the plate and jacket; and a removable shackle lock adapted to fit snugly inside said lock protector and to lock said bolt against rotation with respect to said anchor plate and said jacket.

9. The combination with valve locking means including a removable shackle padlock, of: a protector for said padlock rigidly secured to one of the members of said locking means, and having four solid walls, a slotted end, and an open end, and an opening in one of said solid walls to permit entrance of the member to be locked.

10. In combination with a locking device including two elements to be locked together and a removable shackle padlock for locking them together, a protector for the padlock rigidly secured to one of the members; an opening in one wall of the protector affording entrance for the other member, a slot in one end of the protector affording entrance for the removable shackle, and an opening in the opposite end of the protector affording entrance for the body of the padlock.

THEODORE LEWIS STAINBROOK.